Sept. 29, 1936. J. J. McKEON 2,055,938
PROCESS FOR RECLAIMING OIL WASTE
Filed March 1, 1930 4 Sheets-Sheet 2
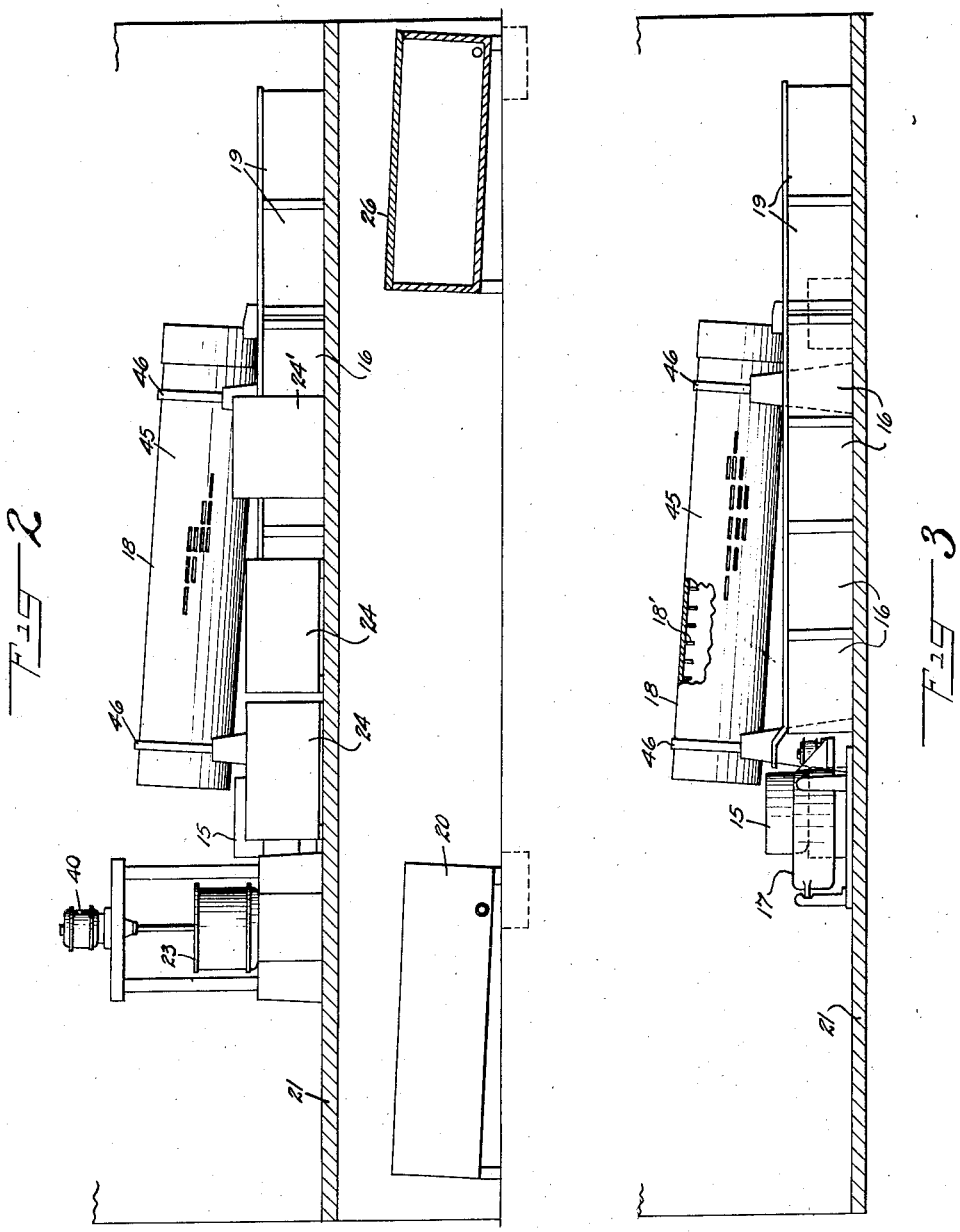

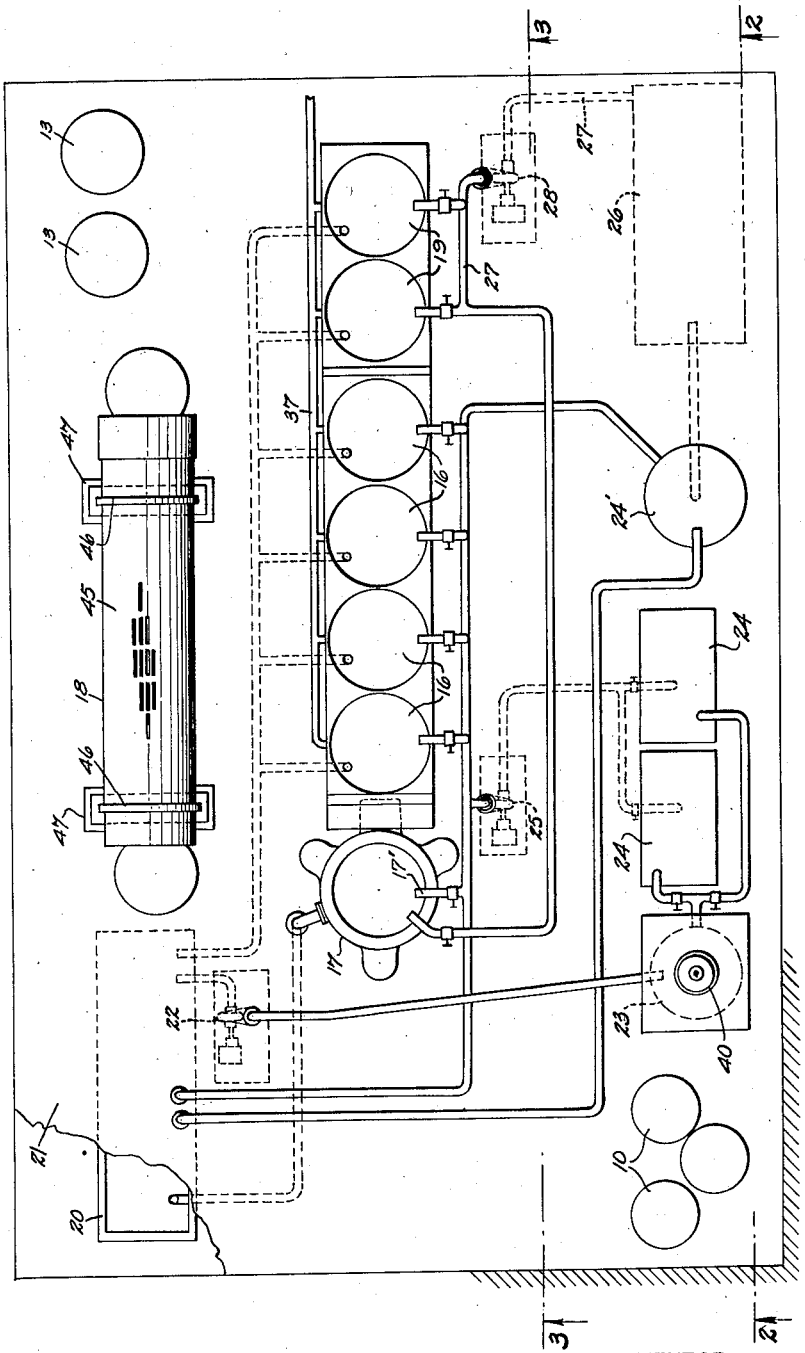

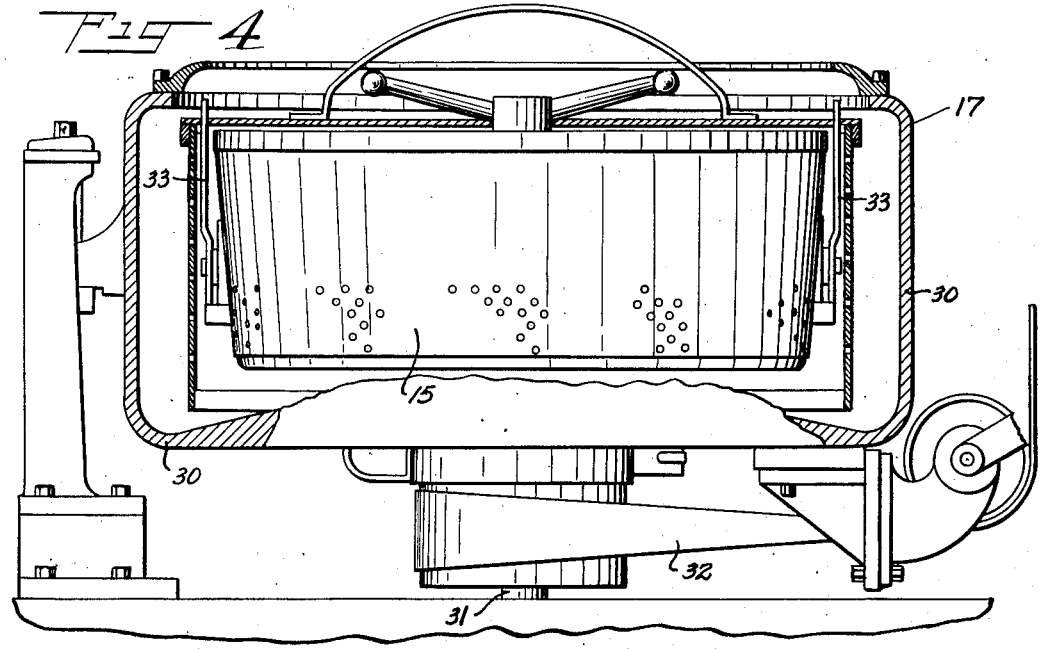
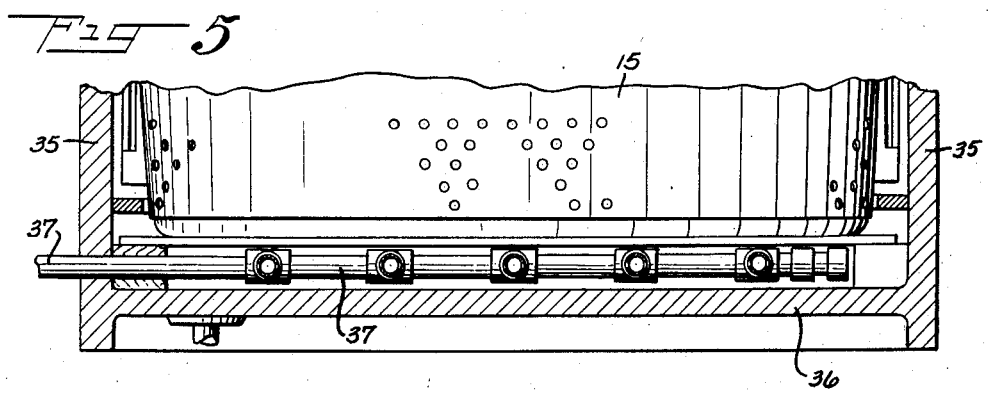
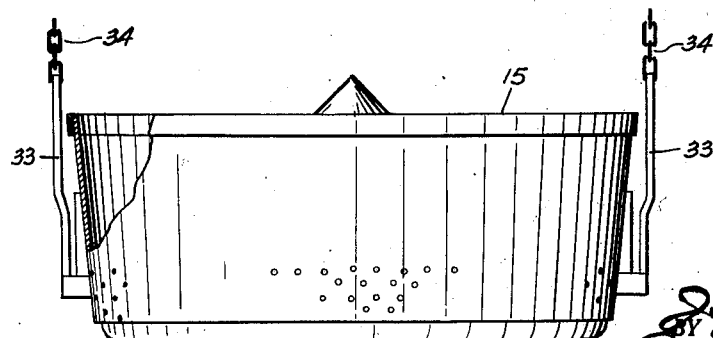

Sept. 29, 1936.    J. J. McKEON    2,055,938
PROCESS FOR RECLAIMING OIL WASTE
Filed March 1, 1930    4 Sheets-Sheet 4
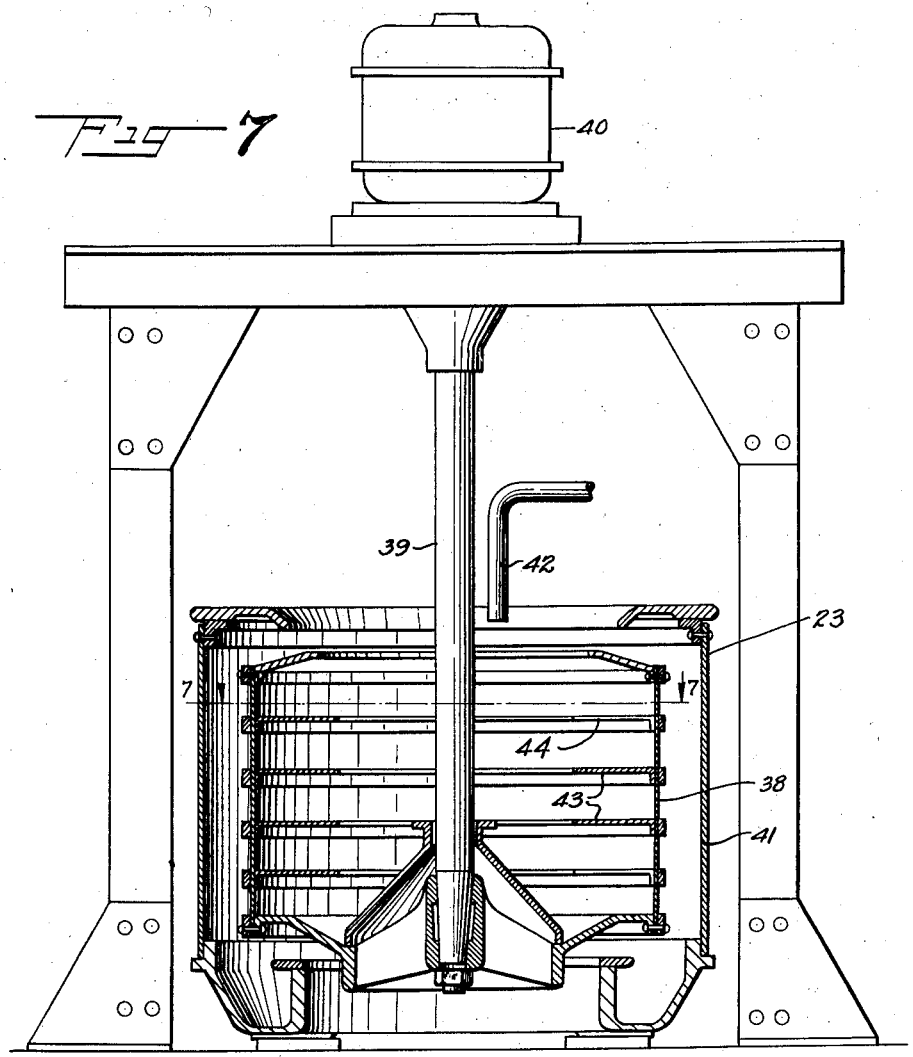
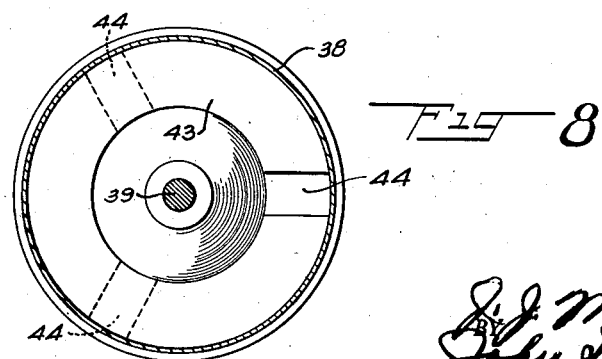
INVENTOR.
J. J. McKeon
John D. Morgan
ATTORNEY Patented Sept. 29, 1936

2,055,938

UNITED STATES PATENT OFFICE 2,055,938

PROCESS FOR RECLAIMING OIL WASTE

John J. McKeon, Troy, N. Y., assignor, by mesne assignments, to Railway Service & Supply Corporation, Indianapolis, Ind., a corporation of Indiana Application March 1, 1930, Serial No. 432,392

10 Claims. (Cl. 141—2)

The invention relates to a novel and useful process of reclaiming oil waste such as is used for the lubrication of railway journal bearings and the like and to the cleaning of oil impregnated fibrous material.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel steps, process and improvements herein shown and described.

The accompanying drawings, referred to herein and constituting a part hereof, illustrate one embodiment of the invention, and together with the description, serve to explain the principles of the invention.

Of the drawings:—

Fig. 1 is a diagrammatic plan view of a plant showing typical apparatus for carrying out the present invention;

Fig. 2 is a vertical section taken on the line 2—2 of Fig. 1;

Fig. 3 is a fragmentary vertical section taken on the line 3—3 of Fig. 1;

Fig. 4 is a detail view partly in section, of an extractor suitable for use in my process;

Fig. 5 is a detail view, partly in section, of a tank for use in my process;

Fig. 6 is a detail, partly in section, of a waste treating basket;

Fig. 7 is a detail view, partly in section, of a clarifying centrifugal for use in the present invention; and Fig. 8 is a cross section taken on the line 7—7 of Fig. 7.

In accordance with the present invention, the used oily waste to be reclaimed is preferably placed in the rotatable perforate basket of the centrifugal extractor, and as this basket is rotated at a very slow speed, the oily waste is treated by passing hot reclaimed oil through the waste to thoroughly heat the waste and the oil adherent thereon. This treatment is preferably continued until the oil flowing through the mass of waste is substantially at the same temperature as the oil with which the waste is treated. The basket of the centrifugal machine is then rotated at a relatively high speed until substantially all of the oil has been removed from the mass of oily waste, and thereafter the waste is tumbled or otherwise treated to loosen the fibres. After this, the waste is preferably returned to the basket of the centrifugal machine and is again treated with the heated reclaimed oil. The waste is then subjected to further centrifugal treatment to extract the oil therefrom, is again tumbled, and when the fibres have been thoroughly loosened, the waste may be saturated with clean oil and can be used in this condition, although it is preferably again extracted in a centrifugal extractor at a predetermined speed and for a predetermined period of time to leave a definite and predetermined percentage of oil in the waste.

According to a modified embodiment of the present invention, the waste is treated with hot reclaimed oil, the oil is extracted therefrom, and the fibres of the waste are thoroughly loosened by tumbling, after which the waste is immersed in a tank of heated oil until saturated, these operations being followed by extracting oil from the waste, tumbling the waste to again loosen the fibres thereof, and thereafter saturating the waste with clean oil.

A still further modification of the invention contemplates the elimination of the first step of treating the dirty waste with oil, and in this modification the dirty waste, preferably while still in its container, is thoroughly heated, and is then subjected to centrifugal force to extract the dirty oil therefrom, after which the waste is tumbled to loosen the fibres, submerged in a tank of heated oil, again subjected to centrifugal force to extract the oil therefrom, and again tumbled to leave it in a fluffy condition so that it will readily receive the clean oil which is thereafter added to it.

Heretofore, in the cleaning and reclaiming of car journal waste and other types of oily waste, it has been customary to dump the dirty waste into a bath of heated oil, and to agitate the waste therein, after which the waste was tumbled to remove the sand, metal and other impurities therefrom. Such processes, however, have proved to be generally unsatisfactory due to the poor quality of the reclaimed waste produced thereby, as well as due to the length of time required for thoroughly heating the waste. It has also been proposed to centrifugally extract the oil from the used waste and then to saturate the waste with clean oil, but these processes have also proved unsatisfactory and produce an inferior grade of waste entirely unsuited to the lubrication of car journals.

The present invention provides a process of reclaiming used oily waste such as car journal waste to give a clean product impregnated with the desired quantity of clean oil. The invention also provides a novel method of reclaiming the used oil recovered from the car journal waste. Another feature of the present invention is the provision of a highly efficient process of handling the used oily waste so that it can be satisfactorily cleaned with a minimum amount of handling, in a minimum period of time, and at an exceedingly low cost, producing a reclaimed oily waste which complies with the exacting standards and requirements established for car journal waste.

Also, according to the present invention, impure oil extracted from the used waste, as well as the oil extracted from the waste after each of the oil treatments to which the waste is subjected during the reclamation process, is preferably reclaimed in substantially the following manner: The oil is first preferably collected and heated in a container, after which it is subjected to prolonged centrifugal action, to separate therefrom the metallic and other heavier impurities. In this condition, the oil is of sufficient purity to render it suitable for use in the present reclaiming process, although the final saturation of the waste is preferably carried out with clean oil which may be produced by settling or otherwise further purifying the centrifugally treated oil.

Oil waste, such as car journal waste, generally consists of a mass of fibrous material, such as cotton and/or wool, substantially saturated with lubricating oil, and this oily waste, after it has been used for the lubrication of railway journal boxes, contains dirty oil, dust, moisture, particles of carbon from the carbonized oil and waste, particles of metal, short fibres and other impurities. The waste to be reclaimed is removed from the journal boxes and is generally packed in fifty gallon steel drums which are shipped to the reclaiming plant.

Referring now in detail to the present preferred embodiment of the process constituting the present invention, these drums containing the dirty waste to be reclaimed, are received at the reclamation plant and, as needed, the dirty waste is dumped from the drums into removable, perforate centrifugal baskets, which are preferably of sufficient capacity to hold the contents of one or two drums. These loaded baskets are placed in the centrifugal machines and are then rotated at a very slow speed while a stream of hot reclaimed oil, preferably at about 220° F. is pumped onto the mass of waste contained in the centrifugal baskets. This treatment of the waste with hot oil and the flowing of the hot oil through the waste is continued until the waste has become thoroughly heated, and this condition is preferably determined by the temperature of the oil flowing from the waste contained in the basket. As soon as the mass has been thoroughly heated, and hot oil flows from the mass of waste, the flow of heated oil to the waste is stopped, and the basket is rotated at a relatively high speed to subject the waste to centrifugal action and to extract the oil therefrom. This centrifugal action is continued until substantially all the oil has been removed from the waste. The treatment of the dirty waste with the hot reclaimed oil in this manner, together with the extraction of substantially all the oil from the mass of waste, cleans the waste and carries a large portion of dirt from the waste.

After the oil has been extracted from the waste in the manner indicated, the loaded basket of the centrifugal machine is removed and its contents are slowly fed to a tumbling mechanism, care being taken to loosen up all the tight bunches of the waste. In order to correctly time the various operations, the time employed for feeding the waste to the tumbling mechanism is preferably substantially the same as the time required for treating the waste in the centrifugal extractor. As the waste travels through the tumbler, the fibres thereof are loosened and separated from each other, a large part of the dirt and foreign matter remaining in the waste is removed therefrom, and the openings in the tumbler are preferably of such a size as to cause the elimination of all of the short fibres of the waste. After the tumbling operation, the waste is replaced in the centrifugal basket, is again placed in the centrifugal extractor and is again subjected to treatment with hot reclaimed oil, the hot reclaimed oil being pumped through the mass of waste while the basket of the centrifugal machine is rotated at a very slow speed, until the mass of waste contained in the basket has been thoroughly heated. After this second treatment with hot reclaimed oil, the mass of waste and oil is again subjected to centrifugal force by rotating the basket at a relatively high speed for the purpose of extracting the oil from the waste, and thereafter the waste is again tumbled to thoroughly loosen the fibres and place the mass of waste in a light, fluffy condition.

This completes the cleaning operations carried out on the waste, and the waste is made ready for use by being saturated with the desired quantity of clean oil. This is preferably accomplished by immersing the waste in a tank of heated clean oil, centrifugally extracting the oil therefrom by rotating the centrifugal basket containing the waste at a predetermined speed for a predetermined period of time, after which the waste may be made up to a definite and standard oil content by adding the proper quantity of clean oil.

According to a modified embodiment of the invention, the dirty oily waste to be reclaimed is first treated by flowing hot reclaimed oil through the mass of waste while the waste is contained in the slowly rotating basket of the centrifugal machine, after which the speed of rotation of the basket is increased to centrifugally extract the oil from the waste, and the waste is then removed from the basket and tumbled to loosen the fibres and remove the impurities. After this treatment, which may preferably be carried out in substantially the manner above set forth, the tumbled waste is returned to the basket of the centrifugal machine, and while contained in this basket, is submerged in a tank of hot, clean oil, where the waste is allowed to remain until it has become thoroughly heated and all the moisture contained in the waste has been removed therefrom. In order to hasten the heating of the waste and to insure the removal of the moisture therefrom, as well as to facilitate the saturation of the waste with oil, the mass of loosened waste may be agitated in any desired manner while the waste is submerged in the tank of heated oil.

After this treatment with heated oil, the basket, together with its load of waste, is removed from the tank of heated oil and is placed in the centrifugal extractor where the waste is subjected to centrifugal force, removing substantially all the oil therefrom, and as soon as the waste is in a substantially dry condition, it is again tumbled to thoroughly loosen and separate the fibres and to remove the impurities and short fibres from the waste. After the tumbling operation has been completed, the cleaned, loosened mass of waste may be saturated with oil in the manner more fully described above.

According to another modification of the process of the present invention, the barrels of the used oily waste to be reclaimed are heated for a relatively long period of time, and until the entire mass of waste contained in the barrels has become thoroughly and uniformly heated, after which the waste contained in the barrels is dumped in the perforate basket of the centrifugal extractor and is subjected to centrifugal force to extract the dirty oil from the mass of waste in the basket. After the oil has been removed from the waste, the waste is fed to the tumbler where it is tumbled to loosen the fibres of the waste, after which the mass of loosened fibres are returned to the basket and submerged in a tank of heated clean oil until the waste has been thoroughly heated throughout. After the waste has remained in the heated oil for a sufficient length of time, it is removed therefrom, subjected to centrifugal action to remove the oil from the waste, again tumbled, saturated with clean oil and again subjected to centrifugal action to reduce the oil content of the waste to the desired amount.

In accordance with the present preferred practice of the invention, the oil extracted from the waste during the several preceding operations, which oil is contaminated with the impurities and foreign matter from the dirty waste, is collected in a tank and mixed together, and preferably heated to a relatively high temperature to facilitate subsequent cleaning and reclaiming operations.

The dirty oil is then submitted to prolonged centrifugal action causing the heavier particles to be collected on the sides of the centrifugal and allowing the cleaned oil to be removed free of the impurities.

The oil thus reclaimed is used over and over again for the saturation of the waste during the washing operations which include all but the final saturation steps. For the final saturations, clean oil is employed, which may be clean, fresh oil, or reclaimed oil which has been still further treated to remove its impurities.

According to the present preferred manner of carrying out the invention the dirty oil waste containing the impurities is subjected to the various steps of present processes in a reclamation plant of the general type shown in the accompanying drawings and which, in the present instance, preferably consists of the following apparatus:

The drums 10 of dirty oil waste are received at the reclamation plant and, as needed, they are dumped into the removable basket 15 of a centrifugal machine. A loaded basket is then placed on the spindle of a centrifugal machine 17 where it is slowly rotated while being treated with hot reclaimed oil to remove the dirty oil and other impurities from the waste. The basket is then rapidly rotated to extract the oil and the remaining impurities from the waste and, when thoroughly extracted, the waste in basket 15 is fed into a tumbler 18 at one side of the room. The tumbler is perforated and provided with a plurality of longitudinally and inwardly extending pins 18' which carry the waste to the top and allow it to drop thereby loosening and separating the fibres of the extracted waste while the dirt and short fibres sift through the perforations in the tumbler, as the tumbler is rotated. The tumbled waste is then replaced in the basket 15 and is treated with hot oil in the centrifugal machine or by being submerged in the oil contained in one of tanks 16.

When the waste has been thoroughly saturated with oil and the moisture expelled therefrom, the waste is again subjected to centrifugal action to extract the oil from the waste and to further remove the impurities contained in the waste.

When thoroughly extracted, the waste is returned to the tumbler 18, again collected in a basket 15, and immersed in one of the clean oil tanks 19, where it is saturated with clean oil. After this operation is completed, the basket and waste are replaced in the centrifugal extractor 17 and subjected to centrifugal force of a predetermined intensity for a predetermined time. When this final extraction is complete, the basket 15 is removed from the centrifugal machine and the waste in it is packed into clean drums 13 where it may be treated with a further quantity of clean oil.

The oil which is removed from the waste during the several extractions is preferably collected in a sump tank 20 located beneath the main floor 21 of the plant and is pumped from this tank by means of motor-driven pump 22 into a clarifying centrifugal 23, where it is subjected to prolonged centrifugal action to collect and remove the impurities therefrom. The clean oil is run off from the clarifying centrifugal 23 and flows into one of the two tanks 24 from which it can be pumped into one of the heated immersion tanks 16, by pump 25. Tanks 16 are connected with sump tank 20 and the oil contained in them can be returned to the sump tank for further centrifugal treatment, as needed. Tank 24 is also connected with a pipe 17' through which oil may be pumped from the tank into the basket of the centrifugal 17 to treat the waste therein.

A clean oil supply tank 26 is provided beneath floor 21 in which the clean oil is stored, and this tank is connected with the immersion tanks by means of pipe 27 and pump 28.

The reclaimed oil in tank 24 may be, if desired, further treated in settling tanks 24' to remove impurities, from which it may be run into clean oil tank 26.

Preferably, and as here shown, there is provided a plurality of the reclaimed-oil tanks 16, and a lesser number of the clean-oil tanks 19 for each centrifugal machine 17 in order to match up the time cycles of the various operations, thereby enabling all the apparatus in the plant to be used substantially all the time and permitting the plant to be operated at an extremely high degree of efficiency with substantially no idle apparatus. If desired, all of the tanks 16 and 19 may be filled with clean oil.

The apparatus shown and described is illustrative of the apparatus which can be employed for carrying out the present process, but widely different types of apparatus can, of course, be employed without sacrificing the chief advantages of the process of the present invention.

The centrifugal extractor preferably employed in the process of the present invention is generally similar to, and may be that shown in my prior patent, No. 1,739,162, to which reference may be had for a complete description of this mechanism. In general, the extractor comprises a casing 30, within which is rotatably mounted a spindle 31 driven by belt 32, the spindle being provided with suitable supports to receive and rotatably support the perforated basket 15 while its contents are subjected to centrifugal action to remove the oil therefrom. Around the periphery of the basket, there are fixed a plurality of apertured straps 33, of rigid material, with which chains 34 may be connected to lift the basket from the centrifugal extractor.

The immersion tanks 16 and 18 may also be constructed in accordance with the disclosure of said application, and in general consist of an open-topped tank having sides 35 and bottom 36 of steel or other suitable material, slightly longer than the removable centrifugal baskets 15, and provided at its bottom with steam coils 37 by which the oil contained therein can be heated to the desired temperature.

The clarifying centrifugal 23 is preferably of the general type and construction described in the prior patent of T. A. Bryson, No. 1,710,447 in which an imperforate bowl 38 is rotatably suspended by shaft 39, to be driven by motor 40. A casing 41 is provided surrounding the rotatable bowl 38 and the bowl is filled with the oil to be treated from pipe 42. Inwardly projecting from the vertical sides of the bowl are annular baffles 43 arranged one above the other and each provided with an opening 44 allowing the upward flow of the oil contained within the bowl. These openings 44 are arranged in staggered relation to each other and tend to prolong the centrifugal action on the oil undergoing treatment, in the manner set forth more fully in the prior patent of T. A. Bryson, referred to. As the mass of oil is rotated at a relatively high speed in the bowl, the heavier impurities, such as metal particles and any remaining traces of water are thrown to the periphery of the bowl and are caught and retained by the baffles 43, while the oil flows upwardly as it is cleaned.

The tumbling mechanism 18 may be of any suitable form, and as here shown, comprises a relatively long hollow perforate cylinder 45 mounted for rotation by means of annular hoops 46, and may be driven in any suitable manner. On its interior, the tumbler is provided with suitable projections 18' to lift the waste and loosen the fibres thereof as the cylinder is rotated.

The invention in its broader aspects is not limited to the specific mechanisms shown and described but departures may be made therefrom within the scope of the accompanying claims without departing from the principles of the invention and without sacrificing its chief advantages.

What I claim is:—

1. The process of reclaiming used oil waste, which includes placing the used waste in a perforate receptacle, centrifugally extracting the oil therefrom, removing the waste from said receptacle and loosening the waste fibres, replacing the waste in a receptacle, immersing the loaded receptacle in a tank of oil, bodily removing the loaded receptacle, rotating the loaded receptacle at a high speed to extract the oil from the waste, and repeating the operations of loosening, immersing and centrifuging the waste.

2. The process of reclaiming oil waste, which includes passing hot oil through the waste while rotating the waste in a centrifugal basket, extracting the oil from the waste, loosening the fibres of the waste, immersing the waste in heated oil to remove moisture therefrom, extracting the oil from the waste, saturating the waste with clean oil, and removing a portion of the oil therefrom.

3. The process of reclaiming used oily waste, which includes heating the oily waste by passing hot oil through the mass of waste while the waste is supported in a slowly rotating basket, extracting the oil from the waste, tumbling the waste, and again passing hot oil through the waste, extracting, and tumbling.

4. The process of reclaiming used oily waste, which includes heating the oily waste by passing hot oil through the waste while the waste is supported in the perforate basket of a centrifugal machine and is not subjected to appreciable centrifugal force, extracting the oil therefrom by rotating the loaded basket at a high speed, tumbling the waste, and repeating the operations.

5. The process of reclaiming used oily waste, which includes the step of subjecting the waste to the cleansing effect of heated oil, the step of subjecting said waste to an oil removing operation, the step of agitating the waste to loosen up its fibers, the step of again subjecting the waste to the cleansing effect of heated oil, the step of again subjecting the waste to an oil removal operation, and the step of adding to the waste the desired amount of oil for journal box lubrication.

6. The process of reclaiming used oily waste, which includes the step of treating the waste with heated oil, the step of removing from said waste an appreciable portion of said oil, the step of agitating said waste to loosen up its fibers, the step of immersing said waste in a bath of heated oil, the step of removing from said waste an appreciable portion of said oil, and the step of adding to the waste the desired amount of oil for journal box lubrication.

7. The process of reclaiming used oily waste, which includes the step of treating the waste with heated oil, the step of removing from said waste an appreciable portion of said oil, the step of agitating the waste to loosen up its fibers, the step of again treating the waste with heated oil, the step of again removing from said waste an appreciable portion of its oil, the step of again agitating the waste to loosen up its fibers, and the step of adding to the waste the desired amount of oil for journal box lubrication.

8. The process of reclaiming oily waste, which consists in treating the waste in a perforate container with a heated oleaginous medium, in thereafter removing from said waste, while it is yet in said container, an appreciable portion of said oleaginous medium, in thereafter removing said waste from said container and subjecting it to an agitating effect to loosen up its fibers, in thereafter again placing said waste in a perforate container and again treating it with a heated oleaginous medium, in thereafter removing from said waste, while it is in said second mentioned container, an appreciable portion of said second mentioned oleaginous medium, and in thereafter adding to said waste the desired amount of oil for journal box lubrication.

9. The herein described steps of a method of reclaiming used journal box packing made up of a fibrous waste part and an oil part, which steps consist of the step of passing hot oil through said packing while rotating it in the basket of a centrifugal machine; the succeeding step of extracting from said packing the major portion of its oil part; the succeeding step of loosening the fibres of the waste part of the packing; the succeeding step of again supplying said waste part with oil; and the succeeding step of again extracting from said waste part the major portion of its oil.

10. The herein described steps of a method of reclaiming used journal box packing made up of a fibrous waste part and an oil part, which steps consist of the step of passing hot oil through said packing while rotating it in the basket of a centrifugal machine; the succeeding step of extracting from said packing the major portion of its oil part; the succeeding step of loosening the fibres of the waste part of the packing; the succeeding step of again supplying said waste part with heated oil; and the succeeding step of again extracting from said waste part the major portion of its oil.

JOHN J. McKEON.